United States Patent
Masui

(10) Patent No.: US 9,443,234 B2
(45) Date of Patent: Sep. 13, 2016

(54) IMAGE PROCESSING APPARATUS, NON-TRANSITORY COMPUTER READABLE MEDIUM, AND METHOD FOR CHARGING FOR PROCESSING

(71) Applicant: FUJI XEROX Co., Ltd., Minato-ku, Tokyo (JP)

(72) Inventor: Takanori Masui, Kanagawa (JP)

(73) Assignee: FUJI XEROX CO., LTD, Tokyo (JP)

( * ) Notice: Subject to any disclaimer, the term of this patent is extended or adjusted under 35 U.S.C. 154(b) by 0 days.

(21) Appl. No.: 14/479,923

(22) Filed: Sep. 8, 2014

(65) Prior Publication Data

US 2015/0248653 A1 Sep. 3, 2015

(30) Foreign Application Priority Data

Feb. 28, 2014 (JP) ................................. 2014-039503

(51) Int. Cl.
*G06F 15/00* (2006.01)
*G06Q 20/14* (2012.01)

(52) U.S. Cl.
CPC ..... *G06Q 20/145* (2013.01); *H04N 2201/0094* (2013.01)

(58) Field of Classification Search
CPC . G06Q 20/145; G06F 3/1203; G06F 3/1274; G06F 3/1273; G06F 3/1259; G06F 3/1229; H04N 2201/0094
USPC .............................................. 358/1.13–1.14
See application file for complete search history.

(56) References Cited

U.S. PATENT DOCUMENTS

| | | | |
|---|---|---|---|
| 6,516,157 B1* | 2/2003 | Maruta et al. ..................... | 399/8 |
| 8,335,797 B2* | 12/2012 | Sakai ............................ | 707/784 |
| 8,804,159 B2* | 8/2014 | Mori ............................. | 358/1.14 |
| 2005/0141012 A1* | 6/2005 | Oomura ........................ | 358/1.14 |
| 2005/0179937 A1* | 8/2005 | Horihata ....................... | 358/1.15 |
| 2005/0209960 A1* | 9/2005 | Horihata ........................ | 705/39 |
| 2008/0189598 A1* | 8/2008 | Yoshida ........................ | 715/227 |
| 2011/0007359 A1* | 1/2011 | Yamakawa et al. ......... | 358/1.15 |
| 2011/0134442 A1* | 6/2011 | Mori .............................. | 358/1.2 |
| 2015/0036176 A1* | 2/2015 | Naruse ............... | H04N 1/00925 358/1.15 |
| 2015/0043027 A1* | 2/2015 | Nakata ................. | G06K 15/406 358/1.14 |

FOREIGN PATENT DOCUMENTS

| | | |
|---|---|---|
| JP | 2004-186859 A | 7/2004 |
| JP | 2009-071726 A | 4/2009 |

\* cited by examiner

*Primary Examiner* — Saeid Ebrahimi Dehkord
(74) *Attorney, Agent, or Firm* — Sughrue Mion, PLLC

(57) ABSTRACT

An image processing apparatus includes an image processing section that processes an image, a plug-in adding section that adds a plug-in, the plug-in being a function executed in corporation with the image processing section, an additional-charging-information adding section that adds additional charging information as the plug-in is added by the plug-in adding section, the additional charging information being set for a job included in the plug-in, and a charging section that charges for a job on a basis of the additional charging information, in a case where the job to be executed is included in at least one job included in the additional charging information and the job to be executed is executed.

9 Claims, 10 Drawing Sheets

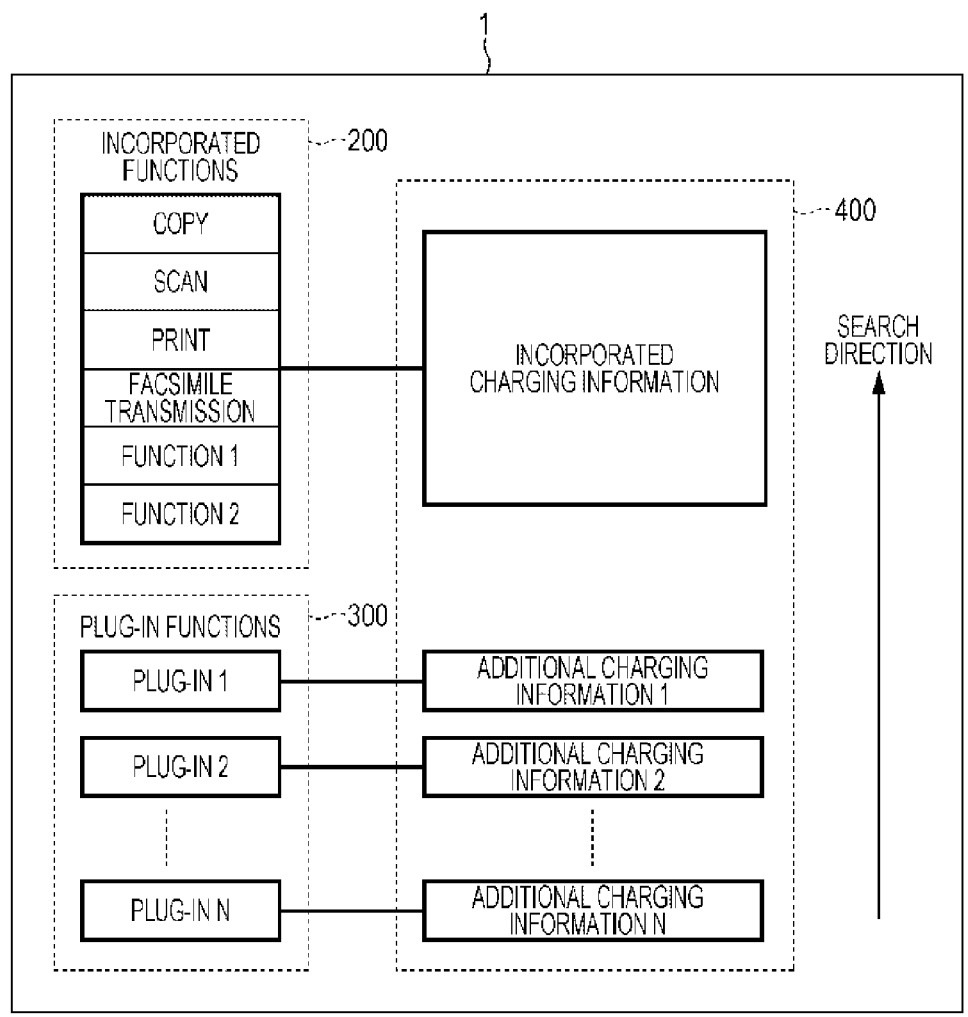

FIG. 4

INCORPORATED CHARGING INFORMATION

| JOB NAME | PARAMETER 1 | PARAMETER 2 | UNIT PRICE (YEN) | UNIT | CHARGING COUNTER |
|---|---|---|---|---|---|
| | COLOR MODE | PAPER SIZE | | | |
| COPY | MONOCHROME | A4 | 10 | PAGE | C01 |
| | MONOCHROME | A3 | 20 | PAGE | C02 |
| | MONOCHROME | OTHER | 20 | PAGE | C03 |
| | COLOR | A4 | 30 | PAGE | C04 |
| | COLOR | A3 | 40 | PAGE | C05 |
| | COLOR | OTHER | 40 | PAGE | C06 |
| SCAN | MONOCHROME | * | 10 | PAGE | C07 |
| | COLOR | * | 10 | PAGE | C08 |
| PRINT | MONOCHROME | * | 10 | PAGE | C09 |
| | COLOR | * | 30 | PAGE | C10 |
| FACSIMILE TRANSMISSION | * | * | 10 | PAGE | C11 |
| FUNCTION 1 | * | * | 20 | PAGE | C12 |
| FUNCTION 2 | * | * | 20 | JOB | C13 |

FIG. 5A

ADDITIONAL CHARGING INFORMATION 1

| PLUG-IN NAME | JOB NAME | PARAMETER 1 COLOR MODE | PARAMETER 2 PAPER SIZE | UNIT PRICE (YEN) | UNIT | CHARGING COUNTER | CHARGING CONDITION |
|---|---|---|---|---|---|---|---|
| PLUG-IN 1 | SERVICE 1 | * | * | 20 | JOB | P1-C01 | SERVICE 1 * SERVICE 2 |
| | SERVICE 2 | * | * | 30 | JOB | P1-C02 | |

FIG. 5B

ADDITIONAL CHARGING INFORMATION 1

| PLUG-IN NAME | JOB NAME | PARAMETER 1 COLOR MODE | PARAMETER 2 PAPER SIZE | UNIT PRICE (YEN) | UNIT | CHARGING COUNTER | CHARGING CONDITION |
|---|---|---|---|---|---|---|---|
| PLUG-IN 1 | SERVICE 1 | * | * | 20 | JOB | P1-C01 | SERVICE 1 + SERVICE 2 |
| | SERVICE 2 | * | * | 30 | JOB | P1-C02 | |

FIG. 6

ADDITIONAL CHARGING INFORMATION 2

| PLUG-IN NAME | JOB NAME | PARAMETER 1 COLOR MODE | PARAMETER 2 PAPER SIZE | UNIT PRICE (YEN) | UNIT | CHARGING COUNTER | CHARGING CONDITION |
|---|---|---|---|---|---|---|---|
| PLUG-IN 2 | SERVICE 3 | * | * | 20 | JOB | P2-C01 | SERVICE 3 * SERVICE 4 + SERVICE 5 |
| | SERVICE 4 | * | * | 30 | JOB | P2-C02 | |
| | SERVICE 5 | * | * | 10 | JOB | P2-C03 | |

FIG. 7

ADDITIONAL CHARGING INFORMATION 3

| PLUG-IN NAME | JOB NAME | PARAMETER 1 COLOR MODE | PARAMETER 2 PAPER SIZE | UNIT PRICE (YEN) | UNIT | CHARGING COUNTER | CHARGING CONDITION |
|---|---|---|---|---|---|---|---|
| PLUG-IN 3 | SCAN | MONOCHROME | * | 20 | PAGE | C07 | — |
| | | COLOR | * | 20 | PAGE | C08 | |

FIG. 8

ADDITIONAL CHARGING INFORMATION 4

| PLUG-IN NAME | JOB NAME | PARAMETER 1 COLOR MODE | PARAMETER 2 PAPER SIZE | UNIT PRICE (YEN) | UNIT | CHARGING COUNTER | CHARGING CONDITION | LOSS COUNTER | LOSS CONDITION |
|---|---|---|---|---|---|---|---|---|---|
| PLUG-IN 4 | SERVICE 1 | * | * | 20 | JOB | P4-C01 | SERVICE 1 * SERVICE 2 | — | — |
| | SERVICE 2 | * | * | 30 | JOB | P4-C02 | | P4-L02 | SERVICE 1 * NOT(SERVICE 2) |

IMAGE PROCESSING APPARATUS, NON-TRANSITORY COMPUTER READABLE MEDIUM, AND METHOD FOR CHARGING FOR PROCESSING

CROSS-REFERENCE TO RELATED APPLICATIONS

This application is based on and claims priority under 35 USC 119 from Japanese Patent Application No. 2014-039503 filed Feb. 28, 2014.

BACKGROUND

Technical Field

The present invention relates to an image processing apparatus, a non-transitory computer readable medium, and a method.

SUMMARY

According to an aspect of the invention, there is provided an image processing apparatus including an image processing section that processes an image, a plug-in adding section that adds a plug-in, the plug-in being a function executed in corporation with the image processing section, an additional-charging-information adding section that adds additional charging information as the plug-in is added by the plug-in adding section, the additional charging information being set for a job included in the plug-in, and a charging section that charges for a job on a basis of the additional charging information, in a case where the job to be executed is included in at least one job included in the additional charging information and the job to be executed is executed.

BRIEF DESCRIPTION OF THE DRAWINGS

Exemplary embodiment of the present invention will be described in detail based on the following figures, wherein:

FIG. 3 explains functions included in the image processing apparatus;

FIG. 4 illustrates an example of incorporated charging information corresponding to incorporated functions;

FIGS. 5A and 5B illustrate an example of Additional Charging Information 1 corresponding to Plug-in 1, representing a case where the charging condition differs between FIG. 5A and FIG. 5B;

FIG. 6 illustrates an example of Additional Charging Information 2 corresponding to Plug-in 2;

FIG. 7 illustrates an example of Additional Charging Information 3 corresponding to Plug-in 3;

FIG. 8 illustrates an example of Additional Charging Information 4 corresponding to Plug-in 4;

DETAILED DESCRIPTION

Hereinafter, an exemplary embodiment of the invention will be described with reference to the attached figures.

Image Processing System

Figure 1:
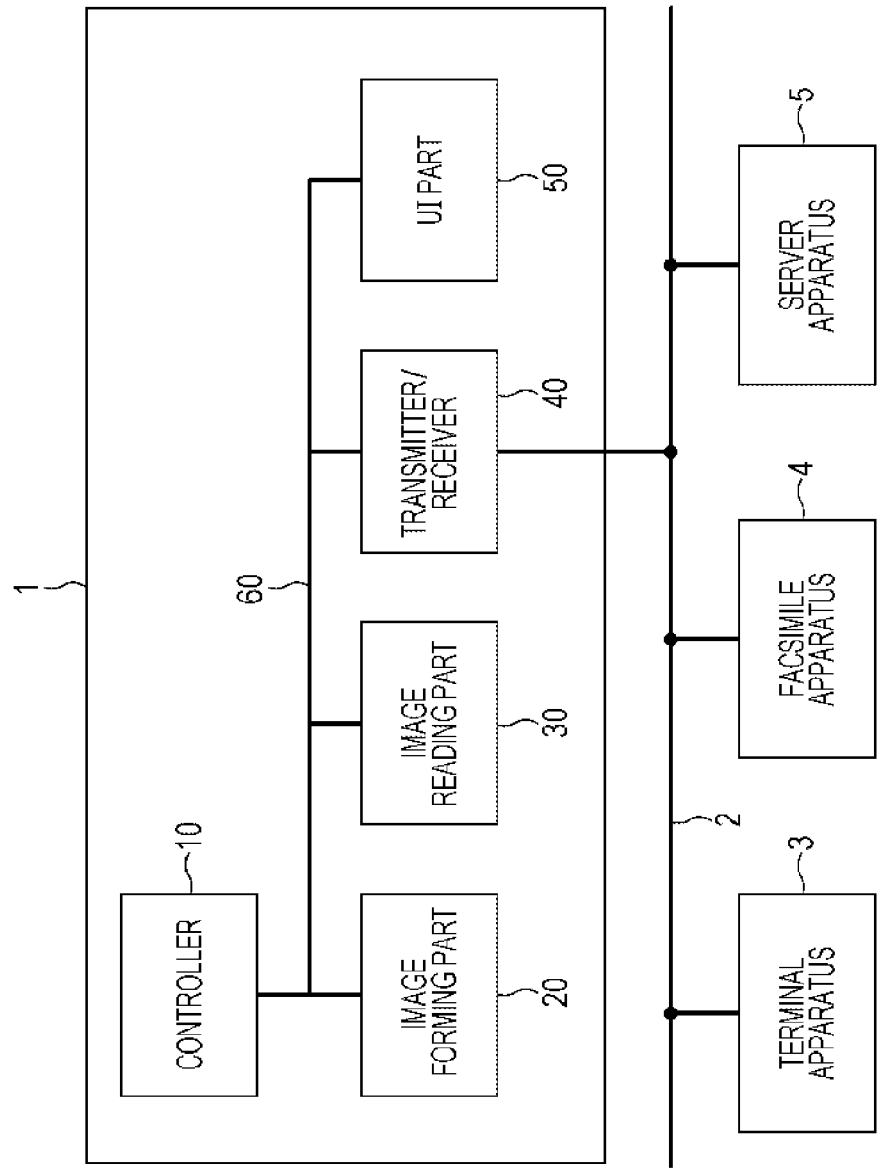
FIG. 1 illustrates an example of the configuration of an image processing system according to the exemplary embodiment.

FIG. 1 illustrates an example of the configuration of an image processing system according to the exemplary embodiment.

This image processing system has an image processing apparatus 1 that works as a so-called multi-function machine including functions such as copy, scan, print, and facsimile functions, a communication line 2 connected to the image processing apparatus 1, a terminal apparatus 3 connected to the communication line 2, a facsimile apparatus 4 connected to the communication line 2, and a server apparatus 5 connected to the communication line 2.

The communication line 2 is configured by an Internet line, a telephone line, or the like. The terminal apparatus 3 instructs the image processing apparatus 1 to execute, for example, processing of an image, via the communication line 2. The terminal apparatus 3 is configured by, for example, a personal computer (PC). Further, the facsimile apparatus 4 transmits and receives facsimiles to and from the image processing apparatus 1 via the communication line 2. Furthermore, the server apparatus 5 transmits and receives data (including programs) to and from the image processing apparatus 1 via the communication line 2.

The server apparatus 5 may be an apparatus that executes so-called cloud computing, or an apparatus that provides cloud services.

Image Processing Apparatus 1

The image processing apparatus 1 includes an image forming part 20, an image reading part 30, a transmitter/receiver 40, a user interface (UI) part 50, and a controller 10. The image forming part 20 forms an image on a recording medium such as paper. The image reading part 30 reads an image recorded on a recording medium such as paper. The transmitter/receiver 40 transmits and receives data to and from the terminal apparatus 3, the facsimile apparatus 4, and the server apparatus 5 via the communication line 2. The UI part 50 accepts instructions from the user, and displays messages to the user. These instructions are related to operations using functions such as power on/off, scan, print, copy, and facsimile, and further, added functions described later. The controller 10 controls operation of the image forming part 20, the image reading part 30, the transmitter/receiver 40, and the UI part 50.

The controller 10, the image forming part 20, the image reading part 30, the transmitter/receiver 40, and the UI part 50 are connected by a control bus 60.

Each of the controller 10, the image forming part 20, the image reading part 30, the transmitter/receiver 40, and the UI part 50 is an example of an image processing section.

In the image processing apparatus 1, an image read from the image reading part 30 is printed onto a recording medium such as paper by the image forming part 20.

Further, in the image processing apparatus 1, data such as an image transmitted from the terminal apparatus 3, the facsimile apparatus 4, or the server apparatus 5, which are placed outside the image processing apparatus 1, is printed onto the recording medium by the image forming part 20 via the communication line 2.

In the image processing apparatus 1, data such as an image read by the image reading part 30 is transmitted from the transmitter/receiver 40 to the terminal apparatus 3, the facsimile apparatus 4, or the server apparatus 5, which are placed outside the image processing apparatus 1, via the communication line 2.

As the transmitter/receiver 40, for example, a transmitter/receiver for the Internet line and a transmitter/receiver for the telephone line may be provided separately.

That is, in the image processing apparatus 1, as incorporated functions described later, the scan function is implemented by the image reading part 30, the print function is implemented by the image forming part 20, the copy function is implemented by the image reading part 30 and the image forming part 20, and the facsimile function is implemented by the image reading part 30, the image forming part 20, and the transmitter/receiver 40.

Controller 10

Figure 2:
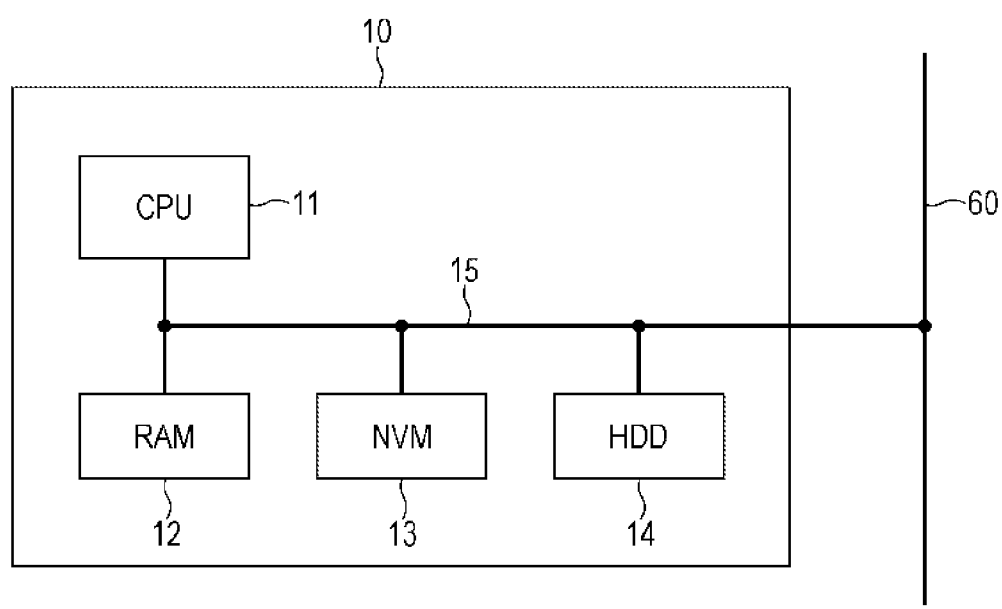
FIG. 2 illustrates an example of the configuration of a controller in an image processing apparatus.

FIG. 2 illustrates an example of the configuration of the controller 10 in the image processing apparatus 1.

The controller 10 includes a central processing unit (hereinafter, referred to as CPU) 11, a random access memory (RAM) 12, a non-volatile memory (hereinafter, referred to as NVM) 13, and a hard disk drive (hereinafter, referred to as HDD) 14.

The CPU 11, the RAM 12, the NVM 13, and the HDD 14 are connected by a signal bus 15.

The signal bus 15 is connected to the control bus 60.

The CPU 11 includes an arithmetic logical unit (ALU) that executes logic operations and arithmetic operations, and the like.

The RAM 12 retains programs and data used by the CPU 11 to execute computations. Hereinafter, the programs and data will be sometimes collectively referred to as data.

Usually, the RAM 12 is a volatile storage medium, which allows reading and writing of data and retention of written data when power is being supplied, and data is lost when power is not being supplied.

The NVM 13 is a non-volatile storage medium, which allows data to be read and written when power is being supplied, and retains written data even when power is not being supplied. The NVM 13 may be a read only memory (ROM) which does not allow data to be rewritten, or may be a flash memory which allows data to be rewritten. The following description assumes that the NVM 13 is a flash memory.

The HDD 14 is a large capacity rewritable non-volatile memory, which retains programs and data for operating the image processing apparatus 1. The NVM 13 may retain these programs and data as firmware. In this case, the controller 10 may not include the HDD 14.

The following description assumes that the NVM 13 retains programs and data for operating the image processing apparatus 1 as firmware.

When the controller 10 is powered on, the CPU 11 reads (loads) a program necessary for operating the image processing apparatus 1 from the NVM 13 into the RAM 12. Then, the controller 10 executes the program from a predetermined address, thereby activating (booting up) the image processing apparatus 1.

Incorporated Functions 200 and Plug-in Functions 300

FIG. 3 explains functions included in the image processing apparatus 1.

The image processing apparatus 1 is capable of executing incorporated functions 200 and plug-in functions 300.

The incorporated functions 200 are standard functions that are incorporated into the image processing apparatus 1 in advance. For example, the incorporated functions 200 include a copy function (indicated as "Copy" in FIG. 3; the same applies hereinafter), a scan function (Scan), a print function (Print), a facsimile function (Facsimile Transmission), another function 1 (Function 1), and another function 2 (Function 2). These functions are functions that may be executed by the image forming part 20, the image reading part 30, and the like included in the image processing apparatus 1, and are closed within the image processing apparatus 1.

While the number of incorporated functions 200 is six in this example, this is illustrative only. The number of incorporated functions 200 may be another number.

The plug-in functions 300 are functions added by the user. In FIG. 3, the plug-in functions 300 are Plug-ins 1 to N (N is an integer not less than one) each having an independent function. The plug-in functions 300 incorporated by the user may be either only one function, for example, Plug-in 1, or multiple functions. Plug-ins 1 to N will be referred to as plug-in when these individual plug-ins are not differentiated from one another.

A plug-in is a program written in a programming language such as Java® or JavaScript®, which is added to the image processing apparatus 1 and executed to customize the functions of the image processing apparatus 1.

A program describing a plug-in may be stored in the HDD 14, or may be acquired via the communication line 2.

An example of each of the plug-in functions 300 will be described below.

Consider the case of executing a series of processes (services) including reading an image as image data by the image reading part 30 of the image processing apparatus 1, transmitting the image data to the server apparatus 5 located outside the image processing apparatus 1 via the transmitter/receiver 40, converting the image data into document data by performing character recognition in the server apparatus 5, and saving the document data in the server apparatus 5.

The process of reading an image by the image reading part 30 is a process (service) using the scan function (Scan) of the image processing apparatus 1. However, the process of converting image data into document data by performing character recognition in the server apparatus 5, and saving the document data in the server apparatus 5 is a process that may not be executed by the image processing apparatus 1 alone. The process of converting image data into document data by performing character recognition in the server apparatus 5, and saving the document data in the server apparatus 5 is herein referred to as cloud service.

The series of processes mentioned above are executed through corporation between the image processing apparatus 1, and the server apparatus 5 and the like located outside the image processing apparatus 1 and connected to the image processing apparatus 1 by the communication line 2.

Accordingly, the process (service) of reading an image by the image reading part 30 as image data and transmitting the image data via the transmitter/receiver 40, and the process (cloud service) of converting received image data into document data by performing character recognition in the server apparatus 5 and saving the document data in the server apparatus 5 are defined as a plug-in, so that these services are executed in succession.

That is, an example of each of the plug-in functions 300 illustrated herein is a composite service.

As described above, in addition to incorporated functions, the image processing apparatus 1 is required to provide services in which the incorporated functions and functions provided outside the image processing apparatus 1 are performed in cooperation with each other.

As mentioned above, the image processing apparatus 1 includes the incorporated functions 200 and the plug-in functions 300. At this time, there are cases where it is necessary to charge for each individual one of the incorporated functions 200 and the plug-in functions 300.

In such cases, for the incorporated functions 200, the image processing apparatus 1 is provided with information for managing charging for these functions (incorporated charging information) in advance.

However, for the plug-in functions 300, information for managing charging that corresponds to each of Plug-ins 1 to N (Additional Charging Information 1 to Additional Charging Information N: N is an integer not less than one) is added when adding Plug-ins 1 to N to the image processing apparatus 1. Additional Charging Information 1 to Additional Charging Information N will be referred to as additional charging information in cases where these individual pieces of additional charging information are not differentiated from one another.

As illustrated in FIG. 3, the image processing apparatus 1 includes incorporated charging information with respect to the incorporated functions 200, as charging information corresponding to the incorporated functions 200 as a whole. In this case, it is assumed that incorporated charging information is retained in the NVM 13 illustrated in FIG. 2. Further, a charging counter specified in the incorporated charging information (see FIG. 4 described later) is added up each time a given one of the incorporated functions 200 is used. Incorporated charging information may be retained on the HDD 14. In this way, incorporated charging information is desirably retained in a non-volatile memory that retains data even without supply of power. Although incorporated charging information may be retained in the RAM 12 that is a volatile storage medium, in this case, data may be lost in the event of, for example, instantaneous power interruption. The following description assumes that the incorporated charging information is retained in the NVM 13.

Additional charging information is set for each individual plug-in. Accordingly, as illustrated in FIG. 3, in the case of Plug-ins 1 to N, Additional Charging Information 1, Additional Charging Information 2, and Additional Charging Information N are set in correspondence to Plug-in 1, Plug-in 2, and Plug-in N, respectively.

Then, each time a plug-in is added, the corresponding additional charging information is added. Additional charging information is also desirably retained in a non-volatile storage medium. In a case where it is not possible to retain additional charging information owing to the limited capacity of the NVM 13, additional charging information may be retained on the HDD 14. The following description assumes that additional charging information is retained on the HDD 14.

Incorporated charging information and additional charging information (Additional Charging Information 1 to Additional Charging Information N) are herein collectively referred to as charging information 400.

Additional charging information is contained in a program describing a plug-in. When adding a plug-in upon a user's instruction from the UI part 50, a program describing the plug-in is read into the RAM 12, thereby adding the corresponding plug-in function to the image processing apparatus 1. Then, additional charging information corresponding to the plug-in is written onto the HDD 14 when the plug-in is read into the RAM 12 and initialized.

The search direction illustrated in FIG. 3 will be described later.

FIG. 4 illustrates an example of incorporated charging information corresponding to the incorporated functions 200.

Incorporated charging information is a so-called charging table, which includes job name, Parameter 1, Parameter 2, unit price (yen), unit, and charging counter.

Examples of job name include "Copy", "Scan", "Print", "Facsimile Transmission", "Function 1", and "Function 2" of the incorporated functions 200.

Parameter 1 represents, for example, color mode, which is "Monochrome" or "Color". Parameter 2 represents, for example, paper size, which is "A4", "A3", or "Other". While the parameters used are Parameter 1 and Parameter 2 in this case, because parameters are items that have to be taken into account when determining the unit price, other parameters may be included. Further, each of the parameters may specify information other than that mentioned above.

Unit price (yen) represents the amount charged per unit.

Examples of unit include "Page" and "Job". That is, in a case where the unit is "Page", the unit price (yen) is charged for each "Page". In a case where the unit is "Job", the unit price (yen) is charged for each "Job".

Charging counter represents an area (address) of a storage medium (memory) where the cumulative total of units is retained. For example, in a case where the job "Copy" is performed for 10 pages with Parameter 1 (color mode) being "Monochrome" and Parameter 2 (paper size) being "A4", a charging counter C01 is counted up by "10". In this case, the count-up value of the charging counter C01 (10)×the unit price of 10 yen=100 yen is charged to the user.

In FIG. 4, "*" means "any". For example, in the case of the job name (abbreviated as job; the same applies hereinafter) "Scan", if Parameter 1 (color mode) is "Monochrome", a charging counter C07 is counted up by "1" for each "Page", irrespective of whether Parameter 2 (paper size) is "A4", "A3", or "Other". Then, the count-up value (1)×the unit price of 10 yen=10 yen is charged to the user.

In the case of the job "Function 1", the unit price of 20 yen is charged for each "Page", irrespective of whether Parameter 1 (color mode) is "Monochrome" or "Color", and irrespective of whether Parameter 2 (paper size) is "A4", "A3", or "Other".

In the case of the job "Function 2", the unit price of 20 yen is charged for each "Job", irrespective of whether Parameter 1 (color mode) is "Monochrome" or "Color", and irrespective of whether Parameter 2 (paper size) is "A4", "A3", or "Other".

As mentioned above, charging for the incorporated functions 200 is managed by referencing the incorporated charging information illustrated in FIG. 4, and charging the corresponding unit price (yen) on the basis of Parameter 1, Parameter 2, and unit for the corresponding job name.

FIGS. 5A and 5B each illustrate an example of Additional Charging Information 1 corresponding to Plug-in 1. In the illustrated example, the charging condition differs between FIG. 5A and FIG. 5B.

Additional Charging Information 1 corresponding to Plug-in 1 is a so-called charging table, which includes plug-in name, job name, Parameter 1, Parameter 2, unit price (yen), unit, charging counter, and charging condition.

Plug-in 1 will be described below as a composite service described as an example of the plug-in functions 300. That is, Plug-in 1 is a composite service including a service (Service 1) which reads an image by the image reading part 30 as image data, and transmits the image data by the transmitter/receiver 40, and a cloud service (Service 2) which performs image recognition on image data received by the server apparatus 5 to convert the image data into document data, and saves the document data.

In Plug-in 1, Service 1 corresponds to the job "Scan" and the job "Facsimile Transmission" of the image processing apparatus 1. Accordingly, the charge to the user for Service 1 has to be paid to the provider of Service 1 such as the owner or administrator of the image processing apparatus 1.

The charge for Service 2 (cloud service) has to be paid to the provider of the cloud service.

That is, Service 1 and Service 2 have to be charged for separately.

Plug-in 1 is a multi-job made up of the jobs "Service 1" and "Service 2". As is apparent from the additional charging information for Plug-in 1 illustrated in FIGS. 5A and 5B, Service 1 and Service 2 are separately charged for.

Since Parameters 1 and 2, unit price (yen), and unit are the same as those of the incorporated charging information illustrated in FIG. 4, a description of these items will be omitted.

A charging counter P1-C01 for Service 1 and a charging counter P1-C02 for Service 2 are provided in the HDD 14 of the controller 10.

In FIG. 5A, it is specified that the charging condition is an AND condition (*) of Service 1 and Service 2. Suppose that a case where Service 1 succeeds is defined as "1", and a case where Service 1 fails is defined as "0", and further, a case where Service 2 succeeds is defined as "1", and a case where Service 2 fails is defined as "0". In a case where Service 1 succeeds ("1"), and Service 2 succeeds ("1") (Service 1*Service 2=1), the charging counter P1-C01 for Service 1 and the charging counter P1-C02 for Service 2 are each counted up by "1".

That is, the count-up value of the charging counter P1-C01 (1)×the unit price of 20 yen=20 yen, and the count-up value of the charging counter P1-C02 (1)×the unit price of 30 yen=30 yen, that is, a total of 50 yen is charged to the user.

Then, the count-up value of the charging counter P1-C01 (1)×the unit price of 20 yen=20 yen is paid to the provider of Service 1, and the count-up value of the charging counter P1-C02 (1)×the unit price of 30 yen=30 yen is paid to the provider of Service 2.

In a case where Service 1 fails ("0"), or in a case where Service 1 succeeds ("1") but Service 2 fails ("0"), the charging counter P1-C01 and the charging counter P1-C02 are not counted up.

Unless Plug-in 1 succeeds, the user is not charged, and neither the provider of Service 1 nor the provider of Service 2 is paid.

The above-mentioned example assumes a case where the output of Service 1 becomes the input of Service 2 and then Service 2 is performed. However, in a case where Service 1 and Service 2 are performed in parallel, the charging counter P1-C01 and the charging counter P1-C02 are not counted up also in a case where Service 1 fails ("0") but Service 2 succeeds ("1").

In FIG. 5B, it is specified that the charging condition is an OR condition (+) of Service 1 and Service 2. In this case, in a case where Service 1 succeeds ("1") but Service 2 fails ("0"), only the charging counter P1-C01 is counted up by "1".

Therefore, although the function of Plug-in 1 is not accomplished, because Service 1 has been used, the count-up value of the charging counter P1-C01 (1)×the unit price of 20 yen=20 yen is charged to the user.

Then, the count-up value of the charging counter P1-C01 (1)×the unit price of 20 yen=20 yen is paid to the provider of Service 1. No payment is made to the provider of Service 2.

In this case, no output is obtained by the user. Accordingly, it may be made possible for the user to take the output of Service 1 that has succeeded ("1"), which is the scanned image data in the above-mentioned example, from the image processing apparatus 1.

In a case where Service 1 and Service 2 are performed in parallel, if Service 1 fails ("0") but Service 2 succeeds ("1"), only the charging counter P1-C02 is counted up by "1".

Therefore, although Plug-in 1 has not succeeded, because Service 2 has been used, the count-up value of the charging counter P1-C02 (1)×the unit price of 30 yen=30 yen is charged to the user.

Then, the count-up value of the charging counter P1-C02 (1)×the unit price of 30 yen=30 yen is paid to the provider of Service 2. No payment is made to the provider of Service 1.

In the above-mentioned above, when adding Plug-in 1 to the image processing apparatus 1, Additional Charging Information 1 is also added.

If Additional Charging Information 1 is not added, the charging for Plug-in 1 has to be managed by using the incorporated charging information illustrated in FIG. 4.

At this time, for example, in the case of simultaneously performing the jobs "Scan", "Copy", and "Facsimile Transmission" included in incorporated charging information, charges may be made individually for these jobs in the incorporated charging information illustrated in FIG. 4 and summed.

However, in the case of adding the above-mentioned composite service to the image processing apparatus 1 as a plug-in, this is handled by rewriting incorporated charging information. Then, when returning to the original service, the incorporated charging information has to be returned to the original state.

Further, in the case of providing multiple services, included those provided by the image processing apparatus 1 and those provided from the outside of the image processing apparatus 1, it is difficult to charge for each corresponding service provider separately.

That is, by adding additional charging information when adding a plug-in as mentioned above, charging may be managed without being restricted by pre-defined incorporated charging information.

In the case of a multi-job including multiple jobs, charging may be set finely by using a charging condition that combines a success ("1") and a failure ("0").

FIG. 6 illustrates an example of Additional Charging Information 2 corresponding to Plug-in 2.

Plug-in 2 is configured as a composite service including jobs "Service 3", "Service 4", and "Service 5", that is, a multi-job.

The charging condition is, for example, an OR condition (+) of an AND condition (*) of Services 3 and 4, and Service 5.

For example, suppose that the job "Service 3" is the job "Service 1" of Plug-in 1, and that the job "Service 4" is the job "Service 2" of Plug-in 1. That is, the Service 3 is a service that reads an image by the image reading part 30 as image data, and transmits the image data by the transmitter/receiver 40, and Service 4 is a cloud service (Service 2) which performs image recognition on image data received by the server apparatus 5 to convert the image data into document data, and saves the document data. Further, Service 5 is the service (installation fee) of a shop in which the image processing apparatus 1 is installed.

In this example, in a case where each of Service 3 and Service 4 succeeds ("1"), charging counters P2-C01 and P2-C02 are counted up by "1". In a case where one or both of Service 3 and Service 4 fail ("0"), the charging counters P2-C01 and P2-C02 are not counted up.

Irrespective of whether one or both of Service 3 and Service 4 succeed ("1") or fail ("0"), because the image processing apparatus 1 has been used, a charging counter P2-C03 is counted up by "1".

In a case where each of Service 3 and Service 4 succeeds ("1"), the count-up value of the charging counter P2-C01 (1)×the unit price of 20 yen=20 yen, the count-up value of the charging counter P2-C02 (1)×the unit price of 30 yen=30 yen, and the count-up value of the charging counter P2-C03 (1)×the unit price of 10 yen=10 yen, that is, a total of 60 yen is charged to the user.

Then, the count-up value of the charging counter P2-C01 (1)×the unit price of 20 yen=20 yen is paid to the provider of Service 3, the count-up value of the charging counter P2-C02 (1)×the unit price of 30 yen=30 yen is paid to the provider of Service 4, and the count-up value of the charging counter P2-C03 (1)×the unit price of 10 yen=10 yen is paid to the provider of Service 5.

In a case where Service 3 fails ("0"), or Service 3 succeeds ("1") but Service 4 fails ("0"), the count-up value of the charging counter P2-C03 (1)×the unit price of 10 yen=10 yen is charged to the user, and this 10 yen is paid to the provider of Service 5.

FIG. 7 illustrates an example of Additional Charging Information 3 corresponding to Plug-in 3.

There is an overlap between the job "Scan" in Additional Charging Information 3 and the job "Scan" in the incorporated charging information illustrated in FIG. 4. For the job "Scan" of Plug-in 3, in a case where Parameter 1 (color mode) is "Monochrome", the unit price per page is 20 yen irrespective of whether Parameter 2 (paper size) is "A4", "A3", or "Other", and in a case where Parameter 1 (color mode) is "Color", the unit price per page is 20 yen irrespective of whether Parameter 2 (paper size) is "A4", "A3", or "Other". The job "Scan" of Plug-in 3 differs from the job "Scan" in the incorporated charging information illustrated in FIG. 4 in this respect.

That is, "Plug-in 3" represents a case where a unit price (yen) different from the unit price (yen) specified in the job "Scan" of the incorporated charging information is provided.

Charging counters C07 and C08 are the same as in the case of the job "Scan" of the incorporated charging information.

In this case, as will be described later, for a job "Scan" designated by the user, Additional Charging Information 3 corresponding to Plug-in 3 is used in precedence to the job "Scan" of the incorporated charging information.

That is, by providing a plug-in like Plug-in 3, charging may be managed in such a way as if the incorporated charging information is rewritten, without actually rewriting the incorporated charging information.

While Plug-in 3 includes only the job "Scan", Plug-in 3 may be a multi-job in which jobs "Copy" and "Facsimile Transmission" are executed in succession, and the unit price may be set to a value lower than that in the incorporated charging information. A discounted unit price may be set in the case of using multiple jobs simultaneously.

FIG. 8 illustrates an example of Additional Charging Information 4 corresponding to Plug-in 4.

This is an extension of Plug-in 1 illustrated in FIGS. 5A and 5B. That is, the job name, Parameter 1, Parameter 2, unit price (yen), unit, charging counter, and charging condition are the same as those of Plug-in 1 illustrated in FIGS. 5A and 5B. Loss counter and loss condition are added to these pieces of information. In accordance with Plug-in 4, charging counters are indicated as P4-C01 and P4-C02.

The case of the composite service described above with reference to FIGS. 5A and 5B will be described as an example. Service 1 of Plug-in 4 is a service that reads an image by the image reading part 30 as image data, and transmits the image data by the transmitter/receiver 40, and Service 2 is a cloud service that performs image recognition on image data received by the server apparatus 5 to convert the image data into document data, and saves the document data.

Further, as in the case illustrated in FIG. 5A, the charging condition is an AND condition (*) of Service 1 and Service 2. At this time, in a case where Service 1 succeeds ("1") but Service 2 fails ("0"), no charge is made to the user, nor is there any payment to the provider of Service 1 that has succeeded ("1").

In this case, Plug-in 4 does not succeed owing to the failure of Service 2 ("0"). Therefore, the charge to the user for Service 1 is passed on to the provider of Service 2 that has failed ("0").

Accordingly, a loss counter P4-L02 is provided for Service 2, and the loss condition is set as an AND condition (*) of Service 1 and a negation (NOT) of Service 2. That is, in a case where Service 1 succeeds ("1") and Service 2 fails ("0"), the loss counter P4-L02 is counted up by "1", and a charge is made to the provider of Service 2. That is, the provider of Service 2 is made to pay the count-up value of the loss counter P4-L02 (1)×the unit price of 20 yen of Service 1=20 yen.

In a case where Service 1 succeeds ("1") and Service 2 succeeds ("1"), the loss counter P4-L02 is not counted up.

Figure 9:
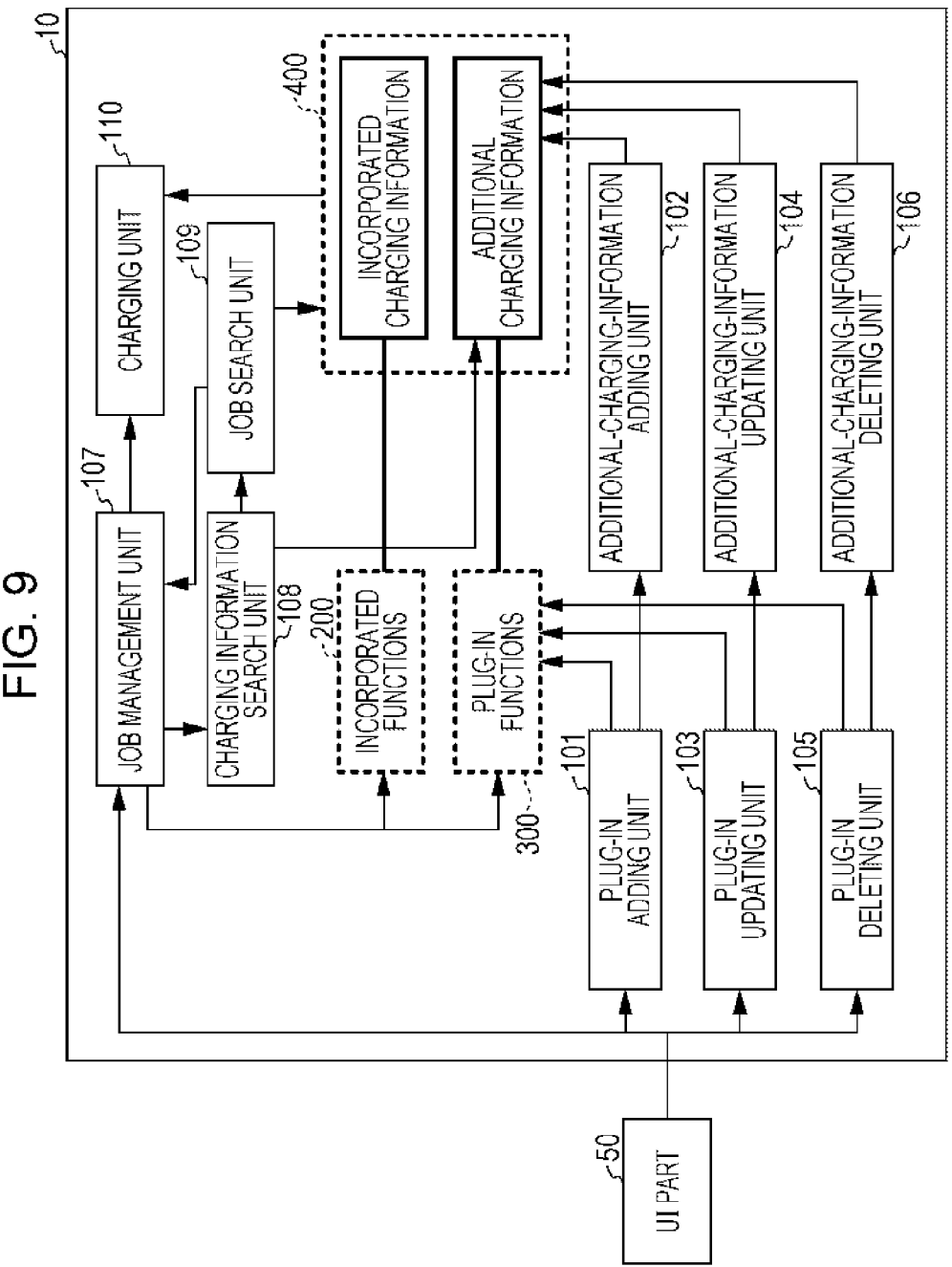
FIG. 9 illustrates an example of the configuration of various units of the controller.

FIG. 9 illustrates an example of the configuration of various units (functional blocks) of the controller 10.

The controller 10 includes a plug-in adding unit 101, an additional-charging-information adding unit 102, a plug-in updating unit 103, an additional-charging-information updating unit 104, a plug-in deleting unit 105, an additional-charging-information deleting unit 106, a job management unit 107, a charging information search unit 108, a job search unit 109, and a charging unit 110. The plug-in adding unit 101 is an example of a plug-in adding section that adds a plug-in. The additional-charging-information adding unit 102 is an example of an additional-charging-information adding section that adds additional charging information as a plug-in is added. The plug-in updating unit 103 is an example of a plug-in updating section that updates a plug-in. The additional-charging-information updating unit 104 is an example of an additional-charging-information updating section that updates additional charging information as a plug-in is updated. The plug-in deleting unit 105 is an example of a plug-in deleting section that deletes a plug-in.

The additional-charging-information deleting unit 106 is an example of an additional-charging-information deleting section that deletes additional charging information as a plug-in is deleted. The job management unit 107 is an example of a job management section that manages a job. The charging information search unit 108 is an example of a charging information search section that searches for the presence of additional charging information when a job is submitted. The job search unit 109 is an example of a job search section that searches for a job in incorporated charging information or additional charging information. The charging unit 110 is an example of a charging section that counts up a charging counter (or loss counter) on the basis of charging information.

The user instructs a plug-in to be added, updated, or deleted via the UI part 50. Further, the user designates a job via the UI part 50.

In the case of adding a plug-in, the plug-in adding unit 101 causes a program describing a designated plug-in to be read into the RAM 12 via the HDD 14 or the communication line 2 and executed. At this time, the additional-charging-information adding unit 102 causes additional charging information to be set on the HDD 14 by the program describing the designated plug-in. Then, the total number of plug-ins is changed to a number equal to the total number of plug-ins before addition of this plug-in plus "1".

In the case of updating a plug-in, the plug-in updating unit 103 causes a program for updating a designated plug-in to be read via the HDD 14 or the communication line 2 and executed, thereby updating the designated plug-in. At this time, the additional-charging-information updating unit 104 causes additional charging information on the HDD 14 to be updated by the program for updating the designated plug-in.

In the case of updating a plug-in, additional charging information may be stored as it is, or additional charging information may be rewritten. In the case of rewriting additional charging information, pre-update data may be deleted and written over with new data, or pre-update data may be converted into post-update data. Conversion from pre-update data to post-update data may be programmed to be executed when a plug-in is initialized.

In the case of deleting a plug-in, the plug-in deleting unit 105 causes a program for deleting a designated plug-in to be read via the HDD 14 or the communication line 2 and executed, thereby deleting the designated plug-in. At this time, the additional-charging-information deleting unit 106 causes additional charging information on the HDD 14 to be deleted by the program for deleting the designated plug-in. Then, numbers assigned to individual plug-ins are set again in the order in which the plug-ins are added, and the total number of plug-ins is set to a number equal to the total number of plug-ins before deletion of this plug-in minus "1".

A plug-in may not be deleted but instead, the user may be made unable to designate the plug-in with the UI part 50.

The job management unit 107 manages a job. When a job and associated Parameters 1 and 2 are designated (submitted) by the user, the submitted job is executed in a case where the job exists in incorporated charging information corresponding to the incorporated functions 200 or in additional charging information corresponding to the plug-in functions 300.

The charging information search unit 108 searches for the presence of additional charging information.

In a case where additional charging information is determined to exist as a result of the search by the charging information search unit 108, the job search unit 109 searches for the presence of the submitted job in the additional search information. In a case where there is no additional charging information, the job search unit 109 searches for the presence of the corresponding job in the incorporated charging information.

In a case where the submitted job exists in the additional charging information or incorporated charging information, the job management unit 107 is notified to that effect, and in accordance with the designated Parameters 1 and 2, the charging unit 110 is notified of the corresponding unit, charging condition, and charging counter. In a case where the loss condition is set for the job in question, the charging unit 110 is notified of the loss condition and the loss counter.

In a case where a plug-in is designated, multiple jobs included in the plug-in are executed as a multi-job.

In a case where the submitted job exists in neither the incorporated charging information nor the additional charging information, the job management unit 107 is notified to that effect.

The charging unit 110 counts up the charging counter as the job is executed, on the basis of the unit and the charging condition that have been notified. In a case where the loss condition is set, the loss counter is counted up on the basis of the loss condition.

Figure 10:
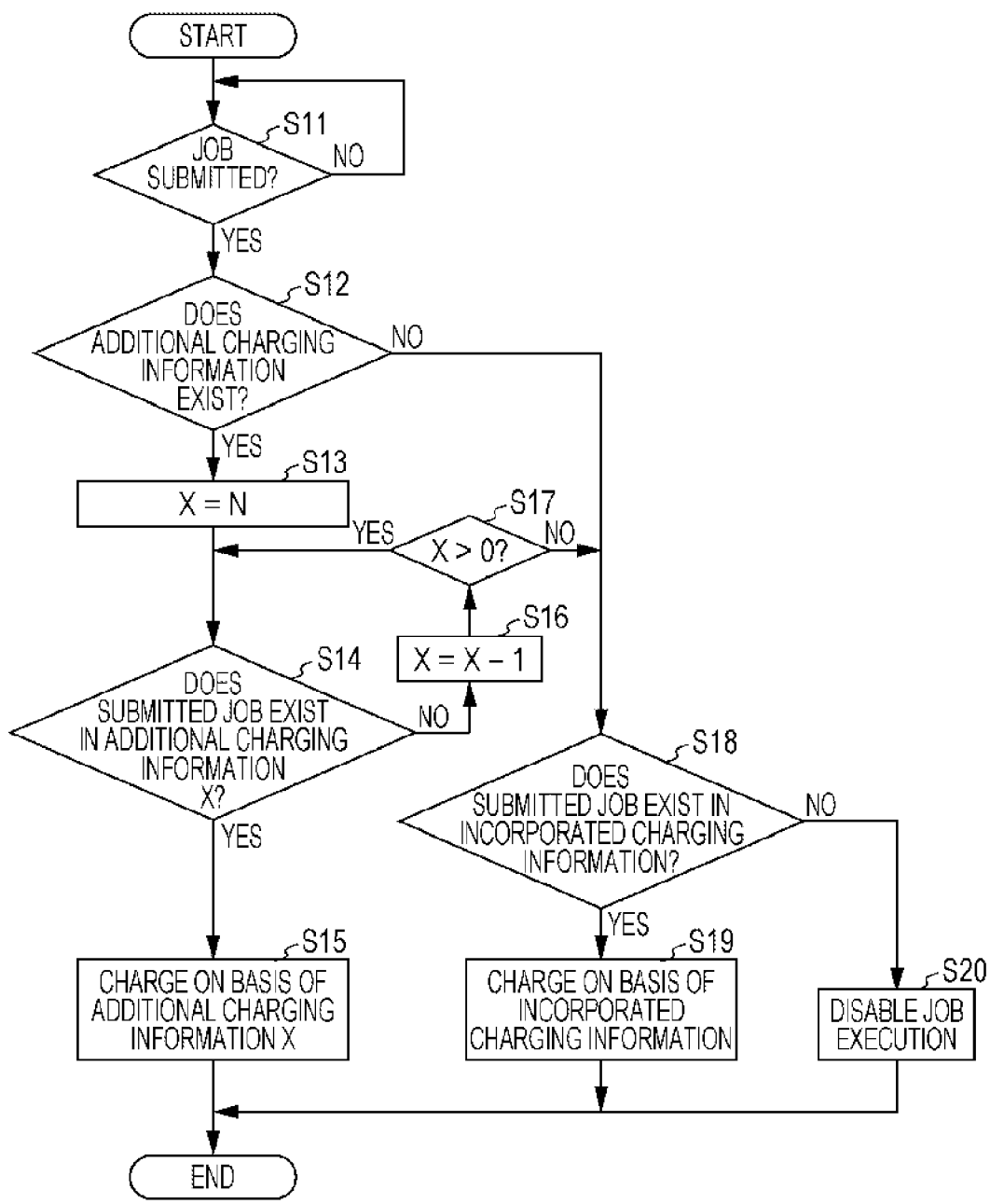
FIG. 10 is a flowchart of a charging process executed by the controller.

FIG. 10 is a flowchart of a charging process executed by the controller 10.

In this case, it is assumed that N plug-ins are added to the image processing apparatus 1 by the plug-in adding unit 101 of the controller 10 (plug-in adding function). It is also assumed that in accordance with the addition of N plug-ins, N pieces of additional charging information corresponding to the N plug-ins are added to the image processing apparatus 1 by the additional-billing-information adding unit 102 of the controller 10 (additional-charging-information adding function).

It is determined by the job management unit 107 of the controller 10 whether or not a job has been submitted by the user (step 11, which is indicated as S11 in FIG. 10; the same applies hereinafter).

In a case where the determination is negative (No) in step 11, that is, in a case where a job has not been submitted, the processing returns to step 11 to wait for submission of a job.

In a case where the determination is positive (Yes) in step 11, that is, in a case where a job has been submitted, it is determined by the charging information search unit 108 of the controller 10 whether or not additional charging information exists (step 12) (charging information search function). The processing in a case where the determination is negative (No) in step 12 will be described later.

In a case where the determination is positive (Yes) in step 12, that is, in a case where additional charging information exists, the total number of pieces of additional charging information (N) is read and put into a variable X by the job search unit 109 of the controller 10 (step 13).

Then, it is determined by the job search unit 109 whether or not the submitted job exists in the job name portion of Additional Charging Information X (step 14) (job search function). The processing in a case where the determination is negative (No) in step 14 will be described later.

In a case where the determination is positive (Yes) in step 14, that is, in a case where the submitted job exists in the job name portion of Additional Charging Information X, the job is executed under management of the job management unit 107 of the controller 10 (image processing function), and a charge is made for the job by the charging unit 110 of the controller 10 on the basis of Additional Charging Information X (step 15) (charging function).

In this case, a search for the submitted job is not made with respect to additional charging information having a number lower than X and incorporated charging information.

In a case where the determination is negative (No) in step 14, that is, in a case where the submitted job does not exist in Additional Charging Information X, "1" is subtracted from the variable X (step 16). Then, it is determined whether or not X is greater than 0 (X>0) (step 17). The processing in a case where the determination is negative (No) in step 17 will be described later.

In a case where the determination is positive (Yes) in step 17, that is, in a case where X is greater than 0 (X>0), the processing returns to step 14, and it is determined whether or not the submitted job exists in Additional Charging Information X.

In a case where the determination is negative (No) in step 12, that is, in a case where there is no additional charging information, it is determined by the job search unit 109 of the controller 10 whether or not the submitted job exists in the incorporated charging information (step 18). The processing in a case where the determination is negative (No) in step 18 will be described later.

In a case where the determination is positive (Yes) in step 18, that is, in a case where the submitted job exists in the job name portion of the incorporated charging information, the job is executed under management of the job management unit 107 of the controller 10, and a charge is made for the job by the charging unit 110 of the controller 10 on the basis of the incorporated charging information (step 19).

In a case where the determination is negative (No) in step 17, that is, in a case where X is zero, in step 18, it is determined by the job search unit 109 of the controller 10 whether or not the submitted job exists in the job name portion of the incorporated charging information.

Then, in a case where the determination is negative (No) in step 18, that is, in a case where the submitted job does not exist in the job name portion of the incorporated charging information, execution of the job is disabled by the job management unit 107 (step 20). In this case, in the image processing apparatus 1, the job is not executed (disabled), and through an "Error" indication on the UI part 50, alarm sound, or the like, the user is notified of the fact that an expected job has been requested for.

As described above, in the flowchart illustrated in FIG. 10, in a case where a plug-in has been added, a job is searched for in additional charging information, in precedence to incorporated charging information.

In this way, even when there is an overlap of job names between additional charging information and incorporated charging information, additional charging information is given precedence in the search.

That is, although the job "Scan" of Additional Charging Information 3 for Plug-in 3 illustrated in FIG. 7 and the job "Scan" of the incorporated charging information illustrated in FIG. 4 are the same, the job "Scan" of Additional Charging Information 3 for Plug-in 3 is used.

Even for the job "Scan" of Plug-in 3, the same charging counters C07 and C08 as those used for the job "Scan" of the incorporated charging information are used. As such, Additional Charging Information 3 of Plug-in 3 is equivalent to information obtained by partially overwriting the incorporated charging information.

As illustrated in FIGS. 3 and 10, even in a case where there are multiple pieces of additional charging information (Additional Charging Information 1 to Additional Charging Information N), as indicated by the search direction in FIG. 3, the multiple pieces of additional charging information are searched for a job in order starting from the highest-numbered piece of additional charging information (from the N side). Therefore, even if the same job name is set in multiple pieces of additional charging information, the highest-numbered piece of additional charging information is given precedence.

At this time, supposing that the higher a plug-in and a piece of additional charging information are numbered, the later the plug-in and the piece of additional charging information are added, that is, the more recently the plug-in and the piece of additional charging information are added, the most recently added piece of additional charging information is used.

Further, by deleting a plug-in in additional charging information for which an overlapping job name exists in incorporated charging information, the incorporated charging information is used.

In a case where incorporated charging information and additional charging information are set so that there is no overlap of job names between the two pieces of information, the job search by the charging information search unit 108 may be started from either one of incorporated charging information and additional charging information.

The following configuration may be employed in a case where it is not desired to permit changes to incorporated charging information. That is, when adding a plug-in, it is determined whether or not there is an overlap of job names between additional charging information for the plug-in and the incorporated charging information, and if there is an overlap, this is regarded as an error and addition of the plug-in is disabled.

Further, at the beginning or end of a predetermined term, the count-up value of the charging counter and, in a case where the loss counter is included, the count-up value of the loss counter are counted, and the results are charged to the user and the like. At this time, the count of the charging counter, and in a case where the loss counter is included, the count of the loss counter may be reset.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a memory configured to store incorporated charging information that is set for a function executed by an image processing section; and
at least one processor configured to implement:
the image processing section that processes an image;
a plug-in adding section that adds a plug-in, the plug-in being a function executed in corporation with the image processing section;
an additional-charging-information adding section that adds additional charging information as the plug-in is added by the plug-in adding section, the additional charging information being set for a job included in the plug-in;

a charging section that charges for a job on a basis of the additional charging information, in a case where the job to be executed is included in at least one job included in the additional charging information and the job to be executed is executed; and a job search section that searches whether or not a job to be executed exists in the incorporated charging information, in a case where the job is not included in the at least one job included in the additional charging information, wherein the charging section charges for a job on a basis of the incorporated charging information, in a case where the job to be executed is determined to exist in the incorporated charging information by the job search section.

2. The image processing apparatus according to claim 1, wherein in a case where a plurality of pieces of the additional charging information exist, the job search section searches the plurality of pieces of the additional charging information for presence of the job to be executed, in order, starting from one of the plurality of pieces of the additional charging information which is added latest.

3. The image processing apparatus according to claim 2, wherein the additional charging information corresponding to the plug-in includes:

a loss counter that is provided in a case where the plug-in includes a plurality of jobs, the loss counter being provided for at least one of the plurality of jobs; and a loss condition that provides that a value of the loss counter is set by a combination of success and failure of the plurality of jobs.

4. The image processing apparatus according to claim 1, wherein the additional charging information corresponding to the plug-in includes:

a plurality of charging counters that is provided in a case where the plug-in includes a plurality of jobs, the plurality of charging counters being provided for the plurality of jobs; and a charging condition that provides that a value of at least one of the plurality of charging counters is set by a combination of success and failure of the plurality of jobs.

5. The image processing apparatus according to claim 1, wherein the additional charging information corresponding to the plug-in includes:

a loss counter that is provided in a case where the plug-in includes a plurality of jobs, the loss counter being provided for at least one of the plurality of jobs; and a loss condition that provides that a value of the loss counter is set by a combination of success and failure of the plurality of jobs.

6. The image processing apparatus according to claim 1, wherein the at least one processor is further configured to implement:

a plug-in deleting section that deletes the plug-in that is added; and an additional-charging-information deleting section that deletes, as the plug-in is deleted by the plug-in deleting section, the additional charging information that is added as the plug-in is added.

7. The image processing apparatus according to claim 1, wherein the at least one processor is further configured to implement:

a plug-in updating section that updates the plug-in that is added; and an additional-charging-information updating section that updates, as the plug-in is updated by the plug-in updating section, the additional charging information that is added as the plug-in is added.

8. A non-transitory computer readable medium storing a program causing a computer to execute a process, the process comprising:

storing incorporated charging information that is set for an executed function;

processing an image;

adding a plug-in, the plug-in being a function executed in corporation with the processing of the image;

adding, as the plug-in is added, additional charging information corresponding to the plug-in, the additional charging information being charging information set for a job included in the plug-in; and charging for a job on a basis of the additional charging information, in a case where the job to be executed is included in at least one job included in the additional charging information and the job to be executed is executed, wherein the additional charging information corresponding to the plug-in includes:

a plurality of charging counters that is provided in a case where the plug-in includes a plurality of jobs, the plurality of charging counters being provided for the plurality of jobs; and a charging condition that provides that a value of at least one of the plurality of charging counters is set by a combination of success and failure of the plurality of jobs.

9. A method comprising storing incorporated charging information that is set for an executed function;

processing an image;

adding a plug-in, the plug-in being a function executed in corporation with the processing of the image;

adding, as the plug-in is added, additional charging information corresponding to the plug-in, the additional charging information being charging information set for a job included in the plug-in; and charging for a job on a basis of the additional charging information, in a case where the job to be executed is included in at least one job included in the additional charging information and the job to be executed is executed, wherein the additional charging information corresponding to the plug-in includes:

a loss counter that is provided in a case where the plug-in includes a plurality of jobs, the loss counter being provided for at least one of the plurality of jobs; and a loss condition that provides that a value of the loss counter is set by a combination of success and failure of the plurality of jobs.

* * * * *